US006552117B2

(12) United States Patent
Moos et al.

(10) Patent No.: US 6,552,117 B2
(45) Date of Patent: Apr. 22, 2003

(54) AQUEOUS COATING COMPOSITION COMPRISING AN ADDITION POLYMER AND A POLYURETHANE

(75) Inventors: Jan Wilhelm Ernst Moos, Boskoop (NL); Johannes Hubertus Van Diemen, Voorburg (NL); Gertrude A. Broekroelofs, Sassenheim (NL)

(73) Assignee: Akzo Nobel N.V., Arnhem (NL)

( * ) Notice: Subject to any disclaimer, the term of this patent is extended or adjusted under 35 U.S.C. 154(b) by 0 days.

(21) Appl. No.: 09/745,674

(22) Filed: Dec. 21, 2000

(65) Prior Publication Data

US 2001/0023273 A1 Sep. 20, 2001

Related U.S. Application Data

(60) Provisional application No. 60/178,407, filed on Jan. 27, 2000.

(30) Foreign Application Priority Data

Dec. 23, 1999 (EP) .............................. 99204497

(51) Int. Cl.$^7$ ................................. C08K 3/00
(52) U.S. Cl. ...................... 524/504; 524/501; 524/507; 524/589
(58) Field of Search ................ 524/501, 504, 524/507, 589

(56) References Cited

U.S. PATENT DOCUMENTS

| | | | |
|---|---|---|---|
| 3,479,310 A | 11/1969 | Dieterich et al. | 260/29.2 |
| 3,640,967 A | 2/1972 | Känig et al. | 260/77.5 |
| 3,905,929 A | 9/1975 | Noll | 260/29.2 TN |
| 3,920,598 A | 11/1975 | Reiff et al. | 260/29.2 TN |
| 4,190,566 A | 2/1980 | Noll et al. | 260/29.2 TN |
| 4,237,264 A | 12/1980 | Noll et al. | 528/67 |
| 4,269,748 A | 5/1981 | Nachtkamp et al. | 260/29.2 TN |
| 4,764,553 A | 8/1988 | Mosbach et al. | 524/591 |
| 4,808,691 A | 2/1989 | Känig et al. | 528/76 |
| 4,829,122 A | 5/1989 | Pedain et al. | 524/591 |
| 5,141,987 A | 8/1992 | Nachtkamp et al. | 524/591 |

FOREIGN PATENT DOCUMENTS

| | | | |
|---|---|---|---|
| DE | 1 570 540 | 3/1970 | C08G/23/00 |
| DE | 1 770 245 | 10/1971 | C08G/22/04 |
| DE | 37 17 060 | 12/1988 | C08G/63/66 |
| DE | 39 36 794 | 5/1991 | C09D/175/04 |
| EP | 0 269 972 | 6/1988 | C08G/18/08 |
| EP | 0 287 144 | 10/1988 | C09D/3/80 |
| EP | 0 955 323 | 11/1999 | C08F/257/02 |
| JP | 349774 | 12/1999 | C08L/51/08 |

OTHER PUBLICATIONS

D. Dieterich, Neuere Wässrige PUR–Systeme, *Angew. Makromol.*, Chem. 98, pp. 133, 142–143 (1981). (English translation attached).
Derwent abstract of Japanese patent JP6192566, Jul. 12, 1994.
Derwent abstract of EPO patent 0 955 323, Nov. 10, 1999.
EPO abstract of Japanese patent JP11349774, Dec. 21, 1999.
Abstract of German Patent 1 570 540.

Primary Examiner—Edward J. Cain
(74) Attorney, Agent, or Firm—Joan M. McGillycuddy

(57) ABSTRACT

The present invention discloses an aqueous coating composition comprising 5 to 95 wt. % of an alkali-swellable core-shell addition polymer (I), and 95 to 5 wt. % of a polyurethane (II).

The present invention provides an aqueous coating composition which may be used as base coat in a base coat/clear coat system which has good mechanical properties, a high flop, a high gloss, practically no strike-in, and a good water-resistance. Due to the fact that higher solids contents can be achieved with the aqueous coating composition of the present invention, a reduction in drying times and number of coats is obtained.

9 Claims, No Drawings

AQUEOUS COATING COMPOSITION COMPRISING AN ADDITION POLYMER AND A POLYURETHANE

This application claims priority of European Patent Application No. 99204497.4, filed on Dec. 23, 1999 and U.S. Provisional Application Ser. No. 60/178,407 filed on Jan. 27, 2000.

The invention relates to an aqueous coating composition comprising an addition polymer and a polyurethane. Preferably, this aqueous coating composition also comprises a metallic pigment, such as aluminium, or a pigment, such as a metal oxide-coated mica, so that coatings with a metallic appearance may be obtained. In this way a differential light reflection effect referred to as "flop" is obtained. A problem with coating systems having a metallic appearance is to obtain a high flop as well as a high gloss.

BACKGROUND OF THE INVENTION

To obtain a high flop, the metallic pigment on application of the coating composition should be well oriented and remain so. To obtain a high gloss, the metallic pigment-containing coating is provided with an unpigmented so-called clear coat. This system is generally called a "base coat/clear coat" system. In actual practice, the base coat will be sprayed with the clear coat, without prior curing of the base coat ("wet-on-wet"). Since the clear coat usually contains organic solvents, steps should be taken to prevent disorientation of the metallic pigment in the base coat as a result of the base coat being softened by the organic solvents in the clear coat ("strike-in").

An aqueous base coat composition is known from EP-A-0 287 144, i.e. a non-cross-linked core-shell dispersion where the shell, when swollen, provides the desired rheological properties. A decrease in strike-in is observed. However, it has been established that this coating composition needs improvement in respect of several coating properties, such as covering power and drying times.

SUMMARY OF THE INVENTION

The present invention now provides an aqueous coating composition which may be used as base coat in a base coat/clear coat system which has good mechanical properties, a high flop, a high gloss, practically no strike-in, and a good water-resistance. Due to the fact that higher solids contents can be achieved with the aqueous coating composition of the present invention, a reduction in drying times and number of coats is obtained. In one or more of these properties the aqueous coating composition of the present invention shows improvement over the one disclosed in EP-A-0 287 144.

The aqueous coating composition according to the invention comprises 5 to 95 wt. % of at least one alkali-swellable core-shell addition polymer (I), and 95 to 5 wt. % of at least one polyurethane (II), the sum of the wt. % indicated for the polymers (I) and (II) always being 100 wt. %.

DETAILED DESCRIPTION OF THE INVENTION

Preferably, the aqueous coating composition comprises 10 to 90 wt. % of at least one addition polymer (I), and 90 to 10 wt. % of at least one polyurethane (II).

More preferably, the aqueous coating composition comprises
25 to 75 wt. % of at least one addition polymer (I), and
75 to 25 wt. % of at least one polyurethane (II).

Preferably, the alkali-swellable core-shell addition polymer (I) is a copolymer prepared in two or more steps by emulsion polymerization, and is obtained by the copolymerization in a first step of
A) 60–95 parts by weight (based on 100 parts by weight of addition polymer) of a monomer mixture A consisting of
 i) 65–100 mole % of a mixture of
  a) 60–100 mole % of a (cyclo)alkyl (meth)acrylate of which the (cyclo)alkyl group contains 4–12 carbon atoms, and
  b) 0–40 mole % of a di(cyclo)alkyl maleate and/or a di(cyclo)-alkyl fumarate of which the (cyclo)alkyl groups contain 4–12 carbon atoms,
  the sum of the mole % indicated for the monomers (a) and (b) always being 100 mole %, and
 ii) 0–35 mole % of another copolymerizable, monoalkylenically unsaturated monomer,
 the sum of the mole % indicated for the monomers (i) and (ii) always being 100 mole %, and
by the copolymerization in a subsequent step of
B) 5–40 parts by weight (based on 100 parts by weight of addition polymer) of a monomer mixture B comprising
 iii) 10–60 mole % of (meth)acrylic acid and
 iv) 40–90 mole % of another copolymerizable, monoalkylenically unsaturated monomer,
 the sum of the mole % indicated for the monomers (iii) and (iv) always being 100 mole %,
with the carboxylic acid groups derived from the (meth)acrylic acid being at least partially ionized;
resulting in a non-cross-linked, alkali-swellable core-shell addition polymer (I).

Such alkali-swellable core-shell addition polymers are known from EP-A-0 287 144.

Preferably, the addition polymer is obtained by the copolymerization of
80–90 parts by weight of monomer mixture A and
10–20 parts by weight of monomer mixture B.

Optionally, different monomer mixtures A and/or B may be used successively.

By emulsion polymerization is meant here the polymerization of an ethylenically unsaturated monomer in water in the presence of a water-soluble or water-insoluble initiator and using an emulsifier.

As examples of (cyclo)alkyl (meth)acrylates suitable for use in monomer mixture A and having a (cyclo)alkyl group with 4–12 carbon atoms may be mentioned: butyl acrylate, butyl methacrylate, 2-ethylhexyl acrylate, 2-ethylhexyl methacrylate, octyl acrylate, octyl methacrylate, isobornyl acrylate, isobornyl methacrylate, dodecyl acrylate, dodecyl methacrylate, cyclohexyl acrylate, cyclohexyl methacrylate, and mixtures thereof. It is preferred that monomer mixture A should contain 70–95, more particularly 80–95, mole % of the aforementioned (cyclo)alkyl (meth)acrylate. Preferred monomers are butyl acrylate, butyl methacrylate, and mixtures thereof.

As examples of di(cyclo)alkyl maleates and/or fumarates with (cyclo)alkyl groups having 4–12 carbon atoms suitable for use in monomer mixture A may be mentioned: dibutyl maleate, dibutyl fumarate, 2-ethylhexyl maleate, 2-ethylhexyl fumarate, octyl maleate, isobornyl maleate, dodecyl maleate, cyclohexyl maleate, and mixtures thereof.

As suitable copolymerizable, monoalkylenically unsaturated monomers of which maximally 35, and preferably 5–20, mole % may be used in monomer mixture A may be mentioned: alkyl (meth)acrylates having fewer than 4 carbon atoms in the alkyl group, such as methyl methacrylate, methyl acrylate, ethyl acrylate, ethyl methacrylate, propyl acrylate, propyl methacrylate, and isopropyl acrylate; alkyl maleates and fumarates having fewer than 4 carbon atoms in the alkyl groups, such as dimethyl maleate, diethyl maleate, diethyl fumarate, and dipropyl maleate; (meth)acrylates having ether groups such as 2-methoxyethyl methacrylate, 2-ethoxyethyl methacrylate, 3-methoxypropyl acrylate; hydroxy-alkyl (meth)acrylates, e.g., 2-hydroxyethyl acrylate, 2-hydroxyethyl methacrylate, 2-hydroxypropyl acrylate, 2-hydroxypropyl methacrylate, 4-hydroxybutyl acrylate, 6-hydroxyhexyl acrylate, p-hydroxycyclohexyl acrylate, p-hydroxycyclohexyl methacrylate, hydroxypolyethylene glycol (meth)acrylates, hydroxypolypropylene glycol (meth)acrylates, and the corresponding alkoxy derivatives thereof; epoxy (meth)acrylates, such as glycidyl acrylate and glycidyl methacrylate; monovinyl aromatic hydrocarbons, such as styrene, vinyl toluene, α-methyl styrene, and vinyl naphthalene; also acrylamide and methacrylamide, acrylonitrile, methacrylonitrile, N-methylol acrylamide, and N-methylol methacrylamide; N-alkyl (meth)acrylamides, such as N-isopropyl acrylamide, N-isopropyl methacrylamide, N-t-butyl acrylamide, N-t-octyl acrylamide, N,N-dimethyl aminoethyl methacrylate, and N,N-diethyl aminoethyl methacrylate; monomers, such as vinyl chloride, vinyl acetate, vinyl pyrrolidone, and vinyl propionate, and monomers containing one or more urea or urethane groups, for instance the reaction product of 1 mole of isocyanatoethyl methacrylate and 1 mole of butylamine, 1 mole of benzylamine, 1 mole of butanol, 1 mole of 2-ethylhexanol, and 1 mole of methanol, respectively. Mixtures of these compounds may also be used. Preferred are alkyl (meth)acrylates, such as methyl acrylate, methyl methacrylate, ethyl acrylate, ethyl methacrylate, and mixtures thereof, and hydroxyalkyl (meth)acrylates, such as 2-hydroxyethyl acrylate, 2-hydroxyethyl methacrylate, 2-hydroxypropyl acrylate, 2-hydroxypropyl methacrylate, and mixtures thereof.

Since the addition polymer (I) is non-crosslinked, the choice of the monomers in monomer mixtures A and B is such that, other than the unsaturated bonds, the functional groups present cannot react with each other under the reaction conditions for the preparation of the addition polymer.

As examples of copolymerizable, monoalkylenically unsaturated monomers which may be used in monomer mixture B in addition to the (meth)acrylic acid may be mentioned: monovinyl aromatic hydrocarbons, such as styrene, vinyl toluene, α-methyl styrene, and vinyl naphthalene; nitriles, such as acrylonitrile and methacrylonitrile; acrylic or methacrylic esters, such as methyl methacrylate, methyl acrylate, ethyl acrylate, ethyl methacrylate, propyl acrylate, propyl methacrylate, isopropyl acrylate, butyl acrylate, butyl methacrylate, and 2-ethylhexyl acrylate; hydroxyalkyl (meth)acrylates, e.g., 2-hydroxyethyl acrylate, 2-hydroxyethyl methacrylate, 2-hydroxypropyl acrylate, 2-hydroxypropyl methacrylate, 4-hydroxybutyl acrylate, 6-hydroxyhexyl acrylate, and p-hydroxylcyclohexyl acrylate; (meth)acrylates having ether groups such as 2-methoxyethyl methacrylate, 2-ethoxyethyl methacrylate, and 3-methoxypropyl acrylate; hydroxypolyethylene glycol (meth)acrylates, hydroxypolypropylene glycol (meth) acrylates and the corresponding alkoxy derivatives thereof; ethylenically unsaturated monocarboxylic acids such as crotonic acid and itaconic acid, and compounds such as vinyl chloride, vinyl acetate, vinyl propionate, vinyl pyrrolidone, acrylamide, methacrylamide, and N-alkyl (meth) acrylamides such as N-isopropyl acrylamide, N-t-butyl acrylamide, and N-t-octyl acrylamide. Mixtures of these compounds may also be used. Preferred monomers are methyl acrylate, methyl methacrylate, butyl acrylate, and butyl methacrylate, and mixtures thereof.

It is preferred that monomer mixture B should contain 15–50 mole %, more particularly 20–40 mole % of (meth) acrylic acid and 50–85 mole %, more particularly 60–80 mole % of the copolymerizable, monoalkylenically unsaturated monomer.

Copolymerization of monomer mixture B will generally yield a copolymer having an acid number of 30–450 and preferably of 60–350, and a hydroxyl number of 0–450 and preferably of 60–300. Both the acid number and the hydroxyl number are expressed in mg of KOH per g of copolymer.

The addition polymer (I) has a Mn of from 50,000 to 2,000,000, preferably from 100,000 to 1,000,000.

The emulsifiers preferably used in the emulsion polymerization are of an anionic or non-ionic nature. Examples of anionic emulsifiers include: potassium laurate, potassium stearate, potassium oleate, sodium decyl sulphate, sodium dodecyl sulphate, sodium dodecylbenzene sulphonic acid, and sodium rosinate. Examples of non-ionic emulsifiers include: linear and branched alkyl and alkylaryl polyethylene glycol and polypropylene glycol ethers and thioethers, alkyl phenoxypoly(ethyleneoxy) ethanols such as the adduct of 1 mole of nonyl phenol to 3–12 moles of ethylene oxide; alkyl (ethyleneoxy) ethanols with 8–18 carbon atoms in the alkyl groups, such as the adduct of 1 mole of dodecanol to 3–12 moles of ethylene oxide. Examples of emulsifiers comprising anionic and non-ionic groups are the ammonium or sodium salt of the sulphate of alkyl phenoxypoly (ethyleneoxy) ethanols, such as the adduct of 1 mole of nonyl phenol to 3–12 moles of ethylene oxide, and the ammonium or sodium salt of the sulphate of alkyl (ethyleneoxy) ethanols with 8–18 carbon atoms in the alkyl groups, such as the adduct of 1 mole of $C_{12-14}$ alcohol to 3–12 moles of ethylene oxide. Preferred is the ammonium or sodium sulphate salt of the adduct of 1 mole of $C_{12-14}$ alcohol to 3–12 moles of ethylene oxide.

Also, in emulsion polymerization, the conventional radical initiators may be used in the usual amounts. Examples of suitable radical initiators include water-soluble initiators, such as ammonium persulphate, sodium persulphate, potassium persulphate, and t-butyl hydroperoxide, and water-insoluble initiators, such as bis(2-ethylhexyl) peroxydicarbonate, di-n-butyl peroxy-dicarbonate, t-butyl perpivalate, cumene hydroperoxide, dibenzoyl peroxide, dilauroyl peroxide, 2,2'-azobisisobutyronitrile, and 2,2'-azobis-2-methyl-butyronitrile.

As suitable reducing agents which may be used in combination with, e.g., a hydroperoxide may be mentioned: ascorbic acid, sodium sulphoxylate formaldehyde, thiosulphates, bisulphates hydrosulphates, water-soluble amines such as diethylene triamine, triethylene tetramine, tetraethylene pentamine, N,N'-dimethyl ethanol amine, and N,N-diethyl ethanol amine, and reducing salts such as cobalt, iron, nickel, and copper sulphate.

Optionally, a chain length regulator, for instance n-octyl mercaptan, dodecyl mercaptan, and 3-mercaptopropionic acid, may also be used.

Copolymerization of the monomer mixtures generally is carried out at atmospheric pressure at a temperature of 40–100° C., preferably 60–90° C., in an atmosphere of an inert gas, such as nitrogen. Optionally, however, copolymerization may also be carried out at elevated pressure. In any case, the reaction conditions for monomer mixtures A and B should be chosen such that, other than the unsaturated bonds, functional groups present in the monomer mixtures cannot react with each other.

According to the invention, the carboxylic acid groups derived from the acrylic acid and/or methacrylic acid are at least 40–100% neutralized by the addition of a neutralizing agent. As suitable neutralizing agents for the carboxylic acid may be mentioned ammonia and amines such as N,N-dimethyl ethanol amine, N,N-diethyl ethanol amine, 2-(dimethyl)-amino-2-methyl-1-propanol, triethyl amine, and morpholine. It is preferred that the neutralizing of the carboxylic acid groups be carried out after the polymerization.

Mixtures of alkali-swellable core-shell addition polymers may be used in (I).

An example of a dispersion comprising such an alkali-swellable core-shell addition polymer is Setalux 6801 AQ-24, ex Akzo Nobel Resins.

The polyurethane (II) may in general be prepared from polyisocyanates and polyols as known by the skilled man. Examples thereof include Neorez R970 (ex NeoResins) and Daotan VTW 2275 (ex Vianova Resins). Also included in the definition of polyurethane (II) are hybrids of polyurethane such as polyurethane acrylate hybrids. Examples thereof include Neopac E115 (ex NeoResins) and Daotan VTW 6460 (ex Vianova Resins).

Preferably, polyurethane (II) is a polyurethane polyurea. More preferably, the polyurethane polyurea comprises:
  v) at least 200 milliequivalents per 100 g of solids of chemically incorporated carbonate groups —O—CO—O—, and
  vi) a combined total of up to 320 milliequivalents per 100 g of solids of chemically incorporated urethane groups —NH—CO—O— and chemically incorporated urea groups —NH—CO—NH—.

Such polyurethane polyurea dispersions are known from DE 39 36 794.

Preferably, the polyurethane polyurea comprises at least 250 milliequivalents, per 100 of solids content, of chemically incorporated carbonate groups —O—CO—O—, and a combined total of 200 to 300 milliequivalents, per 100 g of solids content, of urethane groups —NH—CO—O— and urea groups —NH—CO—NH—.

Polyurethane polyurea may be prepared in a known manner by reacting
  a) organic polyisocyanates which contain no hydrophilic groups or groups convertible into hydrophilic groups with
  b) relatively high-molecular weight organic polyhydroxyl compounds which have no hydrophilic groups or groups convertible into hydrophilic groups,
  c) optionally, low-molecular weight compositions containing at least two isocyanate-reactive groups but no hydrophilic groups or groups capable of conversion into hydrophilic groups,
  d) optionally, non-ionic hydrophilic starting components containing at least one isocyanate group or at least one isocyanate-reactive group, and
  e) optionally, starting components containing at least one ionic group or at least one group capable of conversion into an ionic group, as well as at least one isocyanate-reactive hydrogen atom,
provided that the quantities of non-ionic groups and ionic groups present in components d) and e) are sufficient to ensure the dispersibility of the polyurethane polyureas in water.

The reaction between isocyanate groups and hydroxyl groups results in urethane groups, while any urea groups present in the reaction products are formed from amine-functional starting components and/or the reaction between isocyanate groups and the dispersing water, which is always possible during the preparation of the aqueous polyurethane dispersions.

Polyisocyanate component a) includes any polyisocyanate known from polyurethane chemistry. These polyisocyanates generally have a molecular weight of 112 to 1,000, preferably 140 to 400. Suitable polyisocyanates are those which correspond to the formula Q(NCO)n, wherein Q represents an organic group obtained by removing the isocyanate groups from an organic polyisocyanate having a molecular weight of 112 to 1,000, preferably 140 to 400, and n stands for a number from 2 to 4, preferably 2 or 3 and more preferably 2. In the above formula Q preferably represents a divalent aliphatic hydrocarbon group having 4 to 18 carbon atoms, a divalent cycloaliphatic hydrocarbon group having 5 to 15 carbon atoms, a divalent aromatic hydrocarbon group having 6 to 15 carbon atoms or an araliphatic hydrocarbon group having 7 to 15 carbon atoms. Examples of suitable polyisocyanates include tetramethylene diisocyanate, 1,6-diisocyanatohexane (HDI) dodecamethylene diisocyanate, 2,2,4-trimethylhexane diisocyanate, undecane diisocyanate-(1,11), lysine ester diisocyanate, cyclohexane-1,3- and -1,4-diisocyanate, 1-isocyanato-3-isocyanatomethyl-3,5,5-trimethyl cyclohexane (IPDI), and 4,4'-diisocyanato dicyclohexylmethane. Also suitable are aromatic diisocyanates such as 2,4-diisocyanato toluene and/or 2,6-diisocyanato toluene, 4,4"-diisocyanato diphenyl methane, and 1,4-diisocyanato isopropyl benzene. HDI, IPDI and mixtures of these diisocyanates are particularly preferred.

Component b) includes organic polyhydroxyl compounds having a molecular weight of 300 to 5,000, preferably from 500 to 3,000, and containing at least 50% by weight, preferably more than 70% by weight, of polyhydroxy polycarbonates. The polyhydroxy polycarbonates are esters of carbonic acid obtained by the reaction of carbonic acid derivatives, e.g., diphenyl carbonate or phosgene, with diols. Examples of these diols include ethylene glycol, propane-1,2- and 1,3-diol, butane-1,4- and -1,3-diol, hexane-1,6-diol, octane-1,8-diol, neopentyl glycol, 1,4-bis-hydroxymethyl cyclohexane, 2-methyl-propane-1,3-diol, 2,2,4-trimethylpentane-1,3-diol, diethylene glycol, tri- and tetra-ethylene glycol, dipropylene glycol, polypropylene glycols, dibutylene glycol, polybutylene glycols, Bisphenol A and tetrabromo Bisphenol A. The diol component preferably contains from 40 to 100% by weight of a hexane diol, preferably hexane-1,6-diol, and/or hexane diol derivatives preferably containing ether or ester groups in addition to terminal OH groups, e.g., the products obtained by the reaction of 1 mole of hexane diol with ≧1 mole, preferably 1 to 2 moles, of caprolactone according to DE 17 70 245 or the products obtained by the self-etherification of hexane diol to form dihexylene or trihexylene glycol according to DE 15 70 540. The polyether polycarbonate diols described in DE 37 17 060 are also very suitable.

The hydroxyl polycarbonates should be substantially linear although they may, if desired, be slightly branched by the incorporation of polyfunctional components, in particular low-molecular weight polyols such as glycerol, trimethylol propane, hexane-1,2,6-triol, butane-1,2,4-triol, trimethylol propane, pentaerythritol, quinitol, mannitol and sorbitol, methyl glycoside and 1,4,3,6-dianhydrohexitols.

In addition to the polyhydroxy polycarbonates, starting component b) may contain other known polyhydroxyl com pounds having the previously described molecular weights, e.g., b1) dihydroxy polyesters obtained from dicarboxylic acids such as succinic acid, adipic acid, suberic acid, azelaic acid, sebacic acid, phthalic acid, isophthalic acid, terephthalic acid, tetrahydrophthalic acid, and from diols such as ethylene glycol, propane-1,2-diol, propane-1,3-diol, diethylene glycol, butane-1,4-diol, hexane-1,6-diol, octane-1,8-diol, neopentyl glycol, 2-methyl propane-1,3-diol and the various isomeric bis-hydroxymethyl cyclohexanes;

b2) polylactones such as the polymers of ε-caprolactone initiated with the above-mentioned dihydric alcohols; and b3) polyethers, e.g., the polymers or copolymers of tetrahydrofuran, styrene oxide, propylene oxide, ethylene oxide, the butylene oxides or epichloro-hydrin initiated with divalent starter molecules such as water, the above-mentioned diols or amines containing 2 NH bonds, in particular the polymers and copolymers of propylene oxide and optionally ethylene oxide. Ethylene oxide may be used as a portion of the total quantity of ether molecules, provided the resulting polyether diol contains not more than 10% by weight of ethylene oxide units. It is preferred to use polyether diols which have been obtained without the addition of ethylene oxide, especially those based on propylene oxide and tetrahydrofuran alone.

The optionally used starting components c) are known low-molecular weight compounds which have a molecular weight below 300, contain hydroxyl and/or amino groups, and are at least difunctional in isocyanate addition reactions. Compounds which are difunctional in isocyanate addition reactions (chain extenders), compounds which are at least trifunctional in isocyanate addition reactions (cross-linking agents), and mixtures of such compounds may be used as starting components c). Examples of these compounds include low-molecular weight polyhydric alcohols such as ethylene glycol, propane-1,2- and -1,3-diol, butane-1,4- and -1,3-diol, hexane-1,6-diol, octane-1,8-diol, neopentyl glycol, 1,4-bis-hydroxymethyl cyclohexane, 2-methyl-propane-1,3-diol, 2,2,4-trimethyl pentane-1,3-diol, glycerol, trimethylol propane, trimethylol ethane, the isomeric hexane triols and pentaerythritol; low-molecular weight diamines such as ethylene diamine, 1,2- and 1,3-diaminopropane, 1,3-, 1,4- and 1,6-diamino-hexane, 1,3-diamino-2,2-dimethyl propane, isophorone diamine, 4,4'-diamino-dicyclohexyl methane, 4,4-diamino-3,3'-dimethyldicyclohexyl methane, 1,4-bis-(2-amino-prop-2-yl)-cyclohexane, hydrazine, hydrazide, and mixtures of such diamines and hydrazines; higher functional polyamines such as diethylene triamine, triethylene tetramine, dipropylene triamine, and tripropylene tetramine; hydrogenated products of addition of acrylonitrile to aliphatic or cycloaliphatic diamines, preferably those obtained by the addition of an acrylonitrile group to a molecule of a diamine, e.g., hexamethylene propylene triamine, tetramethylene propylene triamine, isophorone propylene triamine or 1,3- or 1,3-cyclohexane propylene triamine, and mixtures of such polyamines.

The hydrophilic starting components d) are compositions containing ethylene oxide units incorporated within polyether chains, specifically:

d1) diisocyanates and/or compositions which contain isocyanate-reactive hydrogen atoms and are difunctional in isocyanate polyaddition reactions, the diisocyanates and compositions also containing polyether side chains containing ethylene oxide units, and d2) monoisocyanates and/or compositions which are monofunctional in isocyanate polyaddition reactions and contain an isocyanate-reactive hydrogen atom, the monoisocyanates and compositions also containing terminal polyether chains containing ethylene oxide units, and d3) mixtures of d1) and d2).

The preparation of these hydrophilic starting components is carried out by methods analogous to those described in U.S. Pat. Nos. 3,920,598, 3,905,929, 4,190,566, and 4,237,264.

The compounds used as starting component e) have at least one isocyanate-reactive group and at least one (potentially) ionic group. They include the alcohols-containing tertiary amino groups, hydroxy carboxylic acids, hydroxy sulphonic acids, amino carboxylic acids, and amino sulphonic acids disclosed in U.S. Pat. No. 3,479,310. Instead of these starting components containing potentially ionic groups, the corresponding salt type derivatives thereof may be used, i.e. ionic groups formed by the quaternization or neutralization of the potentially ionic groups. Examples of suitable quaternizing and neutralizing agents for converting the potentially ionic groups into ionic groups are also set forth in U.S. Pat. No. 3,479,310. When potentially ionic starting components are used, the at least partial conversion of the potentially ionic groups into ionic groups is carried out by quaternization or neutralization after or during preparation of the polyurethane polyureas.

Preferred starting components e) include 2,2-bis-(hydroxy-methyl)-alkane monocarboxylic acids having a total of 5 to 8 carbon atoms and/or salts thereof obtained by partial or complete neutralization with organic amines or $NH_3$. 2,2-dimethylol propionic acid (2,2-bis-hydroxymethyl propionic acid) and/or salts thereof are particularly preferred for use as starting component e).

Preparation of the polyurethanes from the starting components a) to e) is carried out in a known manner in one or more stages using the reactants in such proportions that the equivalent ratio of isocyanate groups present in the starting components to isocyanate-reactive groups present in the starting components is 0.8:1 to 2:1, preferably 0.95:1 to 1.5:1, and more preferably 0.95:1 to 1.2:1.

Component d) is used in a quantity such that the polyurethane polyurea contains 0 to 30% by weight, preferably from 1 to 20% by weight, of ethylene oxide units incorporated into terminal or lateral polyether chains.

The quantity of component e) and the degree of neutralization required to form ionic groups are calculated to ensure that the polyurethane finally obtained contains 0 to 120, preferably 1 to 80 milliequivalents, of ionic groups per 100 g of solids. The total quantity of ethylene oxide units and ionic groups must be sufficient to ensure the dispersibility of the polyurethane polyureas in water.

The reaction of the starting components a) to e) may be carried out in one or more stages, optionally in the presence of an isocyanate-inert, water-miscible solvent, so that the reaction products are obtained in the form of a solution in such a solvent. In this context, the term "solution" denotes either a true solution or a water in oil emulsion which may be formed if, for example, individual starting components are used in the form of aqueous solutions. Examples of suitable solvents include acetone, methylethyl ketone, N-methyl pyrrolidone, and any mixtures of such solvents. These solvents are generally used in such quantities that the reaction products of starting components a) to e) are obtained in the form of 10 to 70 wt. %.

When the preparation of polyurethane polyureas is carried out as a single-stage reaction, the starting components containing isocyanate-reactive groups are preferably mixed together and then reacted with the starting components containing isocyanate groups. This reaction preferably is carried out initially in the absence of solvents at temperatures of 50 to 150° C., optionally in the presence of known catalysts.

The viscosity of the mixture increases during the course of the reaction and one of the above-mentioned solvents is therefore gradually added to the mixture. The polyurethane content of the organic solution finally obtained is adjusted to a concentration of 10 to 70% by weight, in particular 15 to 55% by weight.

When a two-stage process is employed, an isocyanate prepolymer preferably is first prepared solvent-free at about 50 to 150° C. from excess quantities of isocyanate-containing starting components and hydroxyl-containing starting components at an NCO/OH equivalent ratio of 1.1:1 to 3.5:1, preferably 1.2:1 to 2.5:1, with or without a solvent, and this isocyanate prepolymer is then taken up in a solvent if no solvent has been used up to this stage. The solution obtained is then further reacted with chain extenders or cross-linking agents c), which are optionally used in the form of aqueous solutions and are preferably starting components of the above-mentioned type containing primary and/or secondary amino groups. The quantity of starting components c) used in the second stage is calculated to ensure that the equivalent ratio of all the starting components used in the first and second stages conforms to the conditions previously stated.

The end products of both variations (single-stage and two-stage) are solutions of the reaction products in the above-mentioned solvent having a solids content within the ranges indicated above.

If any potentially ionic groups are present, their at least partial conversion into ionic groups by quaternization or neutralization is advantageously carried out before the addition of the dispersing water. If starting component e) contains carboxyl groups, which is preferred, in particular dimethylol propionic acid, the neutralizing agents used preferably are tertiary amines such as triethylamine, tri-n-butylamine, N,N,N-trimethyl cyclohexylamine, N-methyl morpholine, N-methyl piperazine, N,N-dimethyl ethanolamine, N-methyl piperidine, and triethanolamine. For the neutralization of carboxyl groups it is also preferred to use ammonia under the conditions set forth in EP-A-0 269 972.

After the addition of water as solvent or dispersing medium, at least the major proportion of the auxiliary solvent used is optionally removed by distillation. The water is used in a quantity which is sufficient to provide a product with a solids content of 10 to 60% by weight, preferably 20 to 45% by weight.

The polyurethane polyureas may also be prepared by other methods known in the art, for example by using hydrazine or diamines as chain extenders c) in a blocked form, i.e. in the form of the corresponding azines or ketimines, as disclosed in U.S. Pat. Nos. 4,269,748 and 4,829,122.

Alternatively, the so-called prepolymer mixing process may be used (see D. Dieterich, *Angew. Makromol. Chem.* 9A, 142 (1981)). In this process, an NCO prepolymer is initially prepared as described above and after the at least partial conversion of any potentially ionic groups present into ionic groups, the prepolymer is mixed with water to form an emulsion. The NCO groups of the prepolymer are then brought to reaction in the aqueous phase by the addition of amine-functional chain extenders or cross-linking agents c) and/or by a reaction with water.

One example of such a polyurethane polyurea dispersion is Bayhydrol VPLS 2952 ex Bayer.

Mixtures of polyurethanes may be used in (II).

The coating composition of the present invention, being an aqueous coating composition, consists essentially of water. However, about 20 wt. % of liquid content of the coating composition may be an organic solvent. As suitable organic solvents may be mentioned such ether group-containing alcohols as hexylglycol, butoxyethanol, 1-methoxy-propanol-2,1-ethoxy-propanol-2,1-propoxy-propanol-2,1-butoxy-propanol-2, and 1-isobutoxy-propanol-2; alcohols, such as methanol, ethanol, propanol, butanol, pentanol, and hexanol; diols, such as ethylene glycol and diethylene glycol.

The coating composition according to the present invention may be cured by physical drying. Alternatively, however, the coating compositions may be cured in the presence of a curing agent which reacts with hydroxyl and/or carboxyl groups.

Examples of suitable curing agents include N-methylol and/or N-methylol ether groups-containing aminoplasts obtained by reacting an aldehyde, for instance formaldehyde, with an amino or amido groups-containing compound such as melamine, such as Cymel 328, ex Cytec, urea, N,N'-ethylene urea, dicyanodiamide, and benzoguanamine. The resulting compounds are preferably wholly or partially etherified with alcohols having 1–6 carbon atoms, such as methanol, ethanol, n-propanol, isopropanol, n-butanol, isobutanol, amyl alcohol, hexanol, or mixtures thereof. Especially favourable results may be obtained when using a methylol melamine having 4–6 methyl groups per molecule of melamine, at least 3 methylol groups being etherified with butanol or a butanol etherified condensation product of formaldehyde and N,N'-ethylene diurea. Examples of other suitable curing agents include polyisocyanates or water-dispersible blocked polyisocyanate such as a methylethyl ketoxime-blocked, isocyanate group-containing adduct of a polyisocyanate to a hydroxycarboxylic acid, e.g., dimethylol propionic acid, and aliphatic or aromatic carbodiimides.

In addition to the alkali-swellable core-shell addition polymer (I) and the polyurethane (II), the binder composition may also comprise water-dilutable materials such as alkyd resins, polyesters, polyacrylates, and mixtures thereof.

In addition, the coating composition may contain the conventional additives and adjuvants, such as dispersing agents, dyes, accelerators for the curing reaction and rheology modifiers such as Acrysol RM 2020, Acrysol ASE 60, Coatex Rheo 3000, and Viscalex HV 30.

Applicable pigments may have an acid, a neutral or a basic character. Optionally, the pigments may be pre-treated to modify the properties. Examples of suitable pigments include metallic pigments such as aluminium and stainless steel; nacreous pigments, such as mica coated with a metal oxide such as iron oxide and/or titanium dioxide; inorganic pigments, such as titanium dioxide, iron oxide, carbon black, silica, kaolin, talc, barium sulphate, lead silicate, strontium chromate, and chromium oxide; and organic pigments, such as phthalocyanine pigments.

The solids content of the coating composition ranges from 5–60 wt. %, preferably from 10–40 wt. %. This depends on whether a metallic pigment is used or not. The presence of metallic pigments results in a lower solids content compared to when non-metallic pigments are present. However, compared to conventional aqueous base coat systems, the solids content of the coating composition of the present invention is higher in both cases.

Preferably, the coating composition according to the present invention is used as a base coat in a so-called base coat/clear coat system to provide a high gloss metallic appearance. To this end the coating composition according to the invention comprises so-called "non-leafing" aluminium paste or some other metallic pigment. Use of the coating compositions according to the invention as a base coat may prevent the base coat from being softened by the clear coat after being sprayed with it, so that the metallic effect will not be lost.

The clear coat used in the base coat/clear coat system may for instance be a clear baking lacquer of a conventional polyacrylate/melamine composition. The clear coat may also be a two-component polyester or polyacrylate/polyisocyanate composition. The polyisocyanate may be for example the trimer of 1,6-hexamethylene diisocyanate. The clear coat may also be water borne comprising hydrophilic polyisocyanates.

The coating composition according to the invention may be applied to a substrate in any desirable manner, such as by roller coating, spraying, brushing, sprinkling, flow coating, dipping, electrostatic spraying, or electrophoresis, preferably by spraying.

Suitable substrates may be made of wood, metal, and synthetic material, optionally pretreated, e.g. with a primer or filler. Curing may be carried out at ambient temperature or, optionally, at elevated temperature to reduce the curing time. Optionally, the coating composition may be baked at higher temperatures in the range of, for instance, 60 to 160° C., in a baking oven over a period of 10 to 60 minutes. The clear coat may be applied wet-on-wet on the base coat. Optionally, the base coat may be partially cured prior to the application of the clear coat. Also, the base coat may be fully cured prior to the application of the clear coat.

The compositions are particularly suitable in the preparation of coated metal substrates, such as in the refinish industry, in particular the body shop, to repair automobiles and transportation vehicles and in finishing large transportation vehicles such as trains, trucks, buses, and aeroplanes. The compositions of the present invention may also be used in the first finishing of automobiles.

The invention will be further described in the following examples, which must not be construed as limiting the scope of the present invention.

EXAMPLES

The test methods used in the examples are described below.

The spray viscosity was determined with a DIN cup no. 4.

The solids content, the binder content, and the VOC were calculated theoretically. In the calculation of VOC the presence of water is disregarded. The drying time was determined visually. This time started at the moment of spraying the substrate until hiding and ended at the moment the appearance of the coating was opaque.

The following compounds were used:
PAD=Setalux 6801 AQ-24, ex Akzo Nobel Resins
PUR=Bayhydrol VPLS 2952, ex Bayer Examples 1–9

Several colour formulae were prepared to test the coating compositions of the present invention. To this end, binders, pigments, solvents, water, and conventional additives were mixed together. The selected colour formulae are given in Table 1.

Metal panels were prepared with a conventional primer. A black and white sticker was applied to the primed panel to be able to establish the hiding properties of the coating composition. Base coat compositions of the colour formulae provided in Table 1 were sprayed on the panels. The panels were cured at ambient temperature.

As can be seen from the results in Table 2, the coating compositions of the present invention dry noticeably quickly, leading to fast application and taping times. Furthermore, only small amounts of material are needed to provide complete hiding. Finally, the ready-to-spray viscosity versus VOC is excellent.

TABLE 1

| Ex | Colour code | Type | Colour | Solids content (wt. %) | Binder content (wt. %) | PAD* (wt. %) | PUR* (wt. %) | P/B | VOC (g/l) |
|---|---|---|---|---|---|---|---|---|---|
| 1 | KIA 3002 | Solid | Red | 23 | 17 | 37 | 63 | 0.36 | 321 |
| 2 | KIA 9011 | Pearl | Red | 22 | 16 | 58 | 42 | 0.34 | 305 |
| 3 | GMA 92:84 | Pearl | Pink | 20 | 16 | 64 | 36 | 0.27 | 321 |
| 4 | OP 549:91 | Pearl | Red | 20 | 15 | 71 | 29 | 0.33 | 310 |
| 5 | VOL 324 | Metallic | Beige | 17 | 17 | 69 | 31 | 0.19 | 376 |
| 6 | FEU 9352 | Metallic | Silver | 20 | 21 | 50 | 50 | 0.15 | 377 |
| 7 | NISER 3 | Pearl/metallic | Yellow | 18 | 16 | 73 | 27 | 0.27 | 362 |
| 8 | FEU 411 | Solid | White | 32 | 15 | 35 | 65 | 1.35 | 253 |
| 9 | P1607:87 | Solid | Red | 22 | 15 | 55 | 45 | 0.38 | 348 |

*wt. % PAD and PUR provided are based on solid resin

TABLE 2

| Ex | Spray viscosity (sec) | Number of layers | Drying time (min.) | Material usage (g) |
|---|---|---|---|---|
| 1 | n.d. | 2.5 | 13 | 182.5 |
| 2 | n.d. | 2 + mist | 10.5 | 149.7 |
| 3 | n.d. | 2 + mist | 11 | 100 |
| 4 | 36 | 2.5 + mist | 11 | 184 |
| 5 | 28.5 | 2 + mist | 8 | 138 |
| 6 | 24.5 | 2 + mist | 9 | 157 |
| 7 | 26 | 2.5 + mist | 14 | 211 |
| 8 | 25 | 4 | 13 | 204 |
| 9 | 26.5 | 4 | 17 | 231 |

Mist = mist coat
n.d. = not determined

Examples 10 to 13 and Comparative Examples A to D

Several colour formulae were prepared as mentioned in Example 1. As comparative examples the same colour formulae were prepared, except that in the binder composition instead of a mixture of Setalux 6801 AQ 24 and Bayhydrol VPLS 2952, 100% Setalux 6801 AQ 24 was used, in such a way that the pigment binder ratio stayed the same.

Conventional solvents were added to the coating compositions so that each had the same ready-to-spray viscosity and applied as explained in Example 1. The results are reported in Table 3.

| Ex | Colour code | Solids content (wt. %) | P/B | Number of layers | Drying time (min.) | Material usage (g) | Time saving | Material saving |
|----|-------------|------------------------|------|------------------|--------------------|--------------------|-------------|-----------------|
|    | Solid white |                        |      |                  |                    |                    |             |                 |
| 10 | FEU 411     | 35.1                   | 1.35 | 4                | 7                  | 50                 | 26%         | 28%             |
| A  |             | 26.7                   | 1.35 | 5                | 9.5                | 70                 |             |                 |
|    | Solid red   |                        |      |                  |                    |                    |             |                 |
| 11 | P1607:87    | 22                     | 0.37 | 4                | 9.5                | 90                 | 34%         | 10%             |
| B  |             | 18                     | 0.37 | 6                | 14.5               | 100                |             |                 |
|    | Metallic beige |                     |      |                  |                    |                    |             |                 |
| 12 | VOL 324     | 21                     | 0.2  | 2                | 4.5                | 20                 | 25%         | 23%             |
| C  |             | 17                     | 0.2  | 3                | 6                  | 26                 |             |                 |
|    | Pearl red   |                        |      |                  |                    |                    |             |                 |
| 13 | OP 549:91   | 20                     | 0.3  | 2                | 4                  | 35                 | 33%         | 40%             |
| D  |             | 18                     | 0.3  | 4                | 6                  | 60                 |             |                 |

Id. = idem

As can be seen from the results in Table 3, the ready-to-spray viscosity versus the solids content is excellent. Unexpectedly, the coating compositions of the present invention have a higher solids content with the same ready-to-spray viscosity. Furthermore, the coating compositions of the present invention dry noticeably quicker, leading to fast application and taping times. Finally, only small amounts of material are needed to provide complete hiding.

We claim:

1. Aqueous coating composition comprising
   5 to 95 wt. % of at least one alkali-swellable core-shell addition polymer (I), and
   95 to 5 wt. % of at least one polyurethane (II),
   the sum of the wt. % indicated for the polymers (I) and (II) always being 100 wt. %.

2. Aqueous coating composition according to claim 1, wherein the alkali-swellable core-shell addition polymer (I) is a copolymer prepared in two or more steps by emulsion polymerization, and obtained by the copolymerization in a first step of
   A) 60–95 parts by weight (based on 100 parts by weight of addition polymer) of a monomer mixture A consisting of
      i) 65–100 mole % of a mixture of
         a) 60–100 mole % of a (cyclo)alkyl (meth)acrylate of which the (cyclo)alkyl group contains 4–12 carbon atoms, and
         b) 0–40 mole % of a di(cyclo)alkyl maleate and/or a di(cyclo)-alkyl fumarate of which the (cyclo)alkyl groups contain 4–12 carbon atoms,
      the sum of the mole % indicated for the monomers (a) and (b) always being 100 mole %, and
      ii) 0–35 mole % of another copolymerizable, monoalkylenically unsaturated monomer,
      the sum of the mole % indicated for the monomers (i) and (ii) always being 100 mole %, and
   by the copolymerization in a subsequent step of
   B) 5–40 parts by weight (based on 100 parts by weight of addition polymer) of a monomer mixture B comprising
      iii) 10–60 mole % of (meth)acrylic acid and
      iv) 40–90 mole % of another copolymerizable, monoalkylenically unsaturated monomer,
      the sum of the mole % indicated for the monomers (iii) and (iv) always being 100 mole %,
   with the carboxylic acid groups derived from the (meth)acrylic acid being at least partially ionized;
   resulting in a non-crosslinked alkali-swellable core-shell addition polymer (I).

3. Aqueous coating composition according to claim 1, wherein polyurethane (II) is a polyurethane polyurea.

4. Aqueous coating composition according to claim 3, wherein polyurethane (II) is a polyurethane polyurea comprising:
   v) at least 200 milliequivalents per 100 g of solids of chemically incorporated carbonate groups —O—CO—O—, and
   vi) a combined total of up to 320 milliequivalents per 100 g of solids of chemically incorporated urethane groups —NH—CO—O— and chemically incorporated urea groups —NH—CO—NH—.

5. Aqueous coating composition according to claim 1, wherein it comprises pigments.

6. Aqueous coating composition according to claim 5, wherein the pigment is a metallic pigment.

7. Process for the preparation of a multi-layer coating on a substrate comprising the process step of coating the substrate with an aqueous coating composition according to claim 1.

8. Process according to claim 7, wherein the aqueous coating composition is a base coat.

9. Use of the aqueous coating composition according to claim 1 in the refinishing of cars.

* * * * *